Patented Aug. 1, 1950

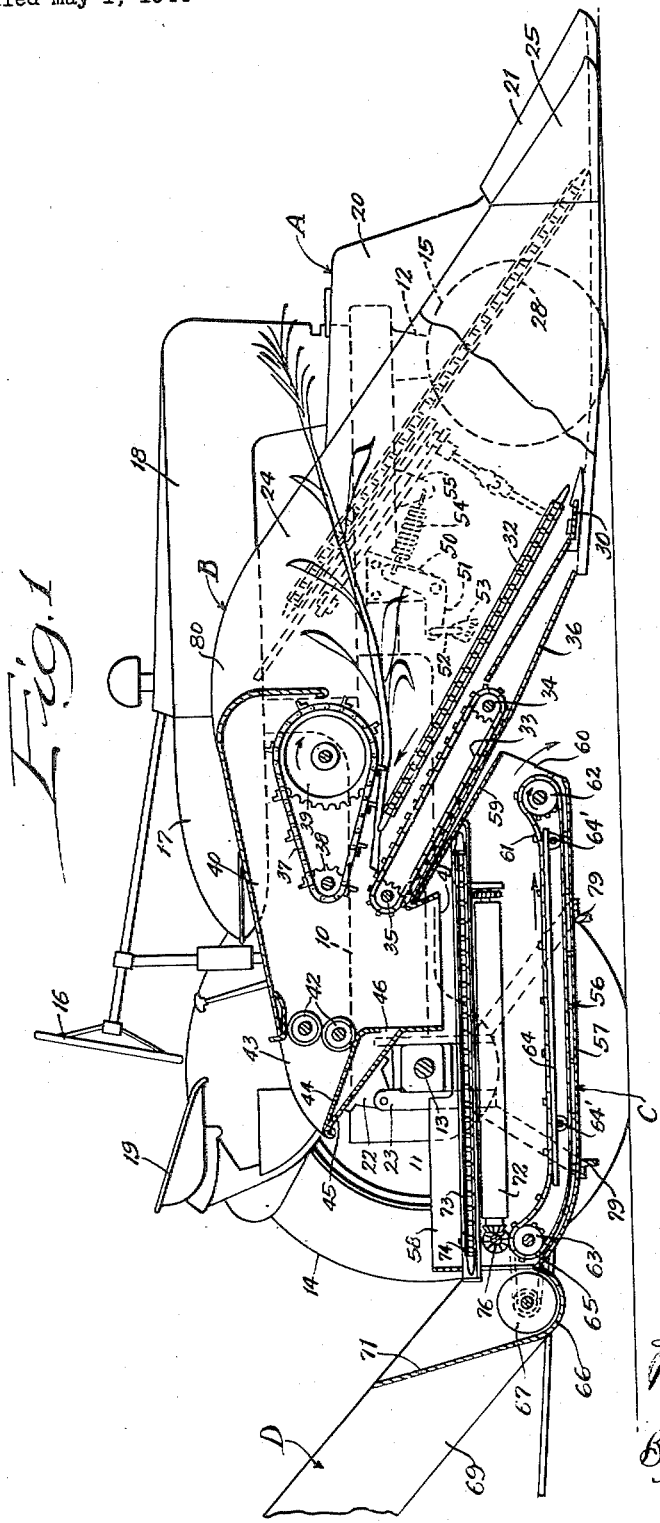

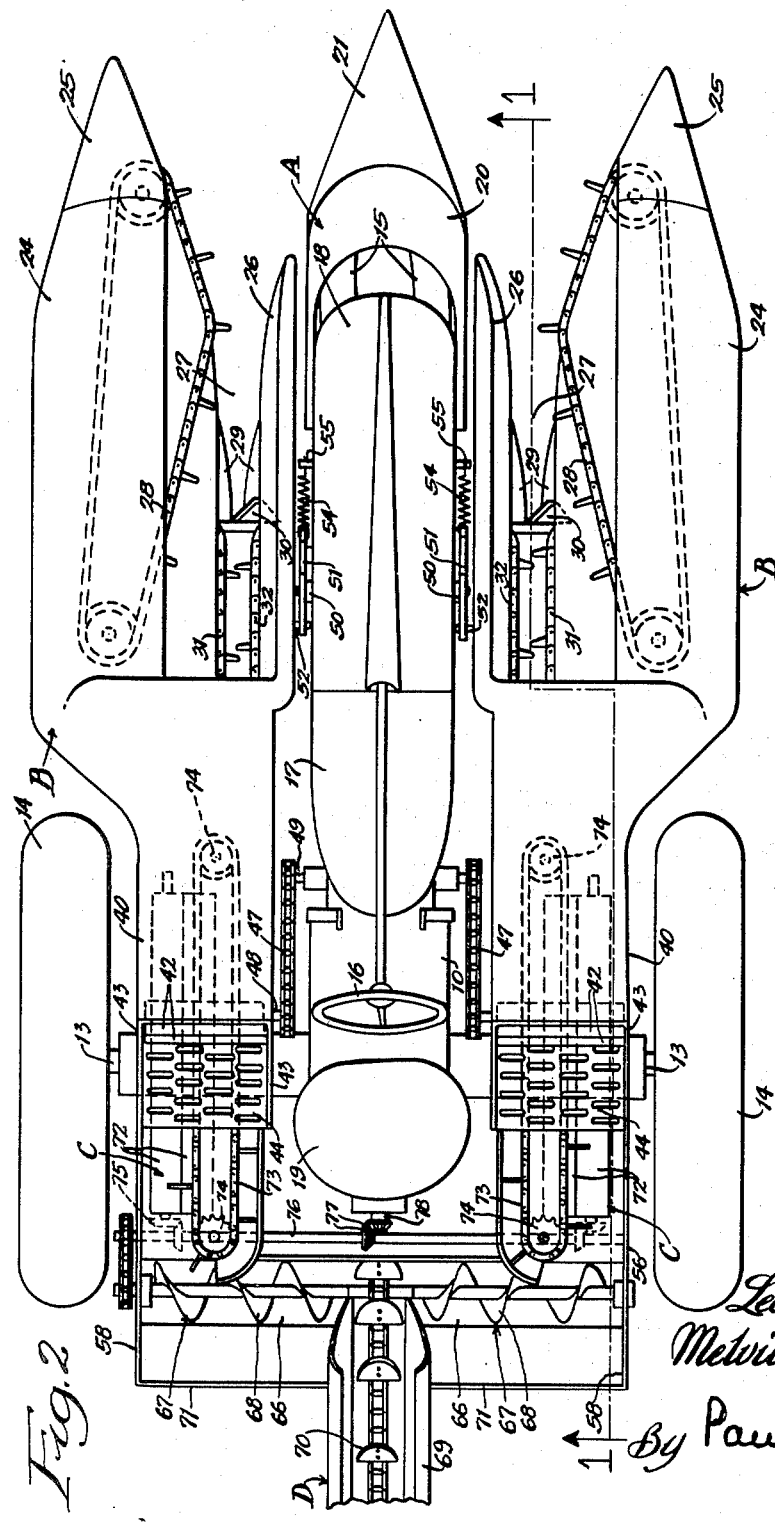

2,517,401

UNITED STATES PATENT OFFICE 2,517,401

CORN HARVESTER

Lee P. Millard, Chicago, and Melville J. Mitchell, Highland Park, Ill., assignors to International Harvester Company, a corporation of New Jersey Application May 1, 1944, Serial No. 533,444

3 Claims. (Cl. 56—15)

This invention relates to a corn harvester. More particularly it relates to a cutter type harvester in which the stalks are first severed and subsequently delivered to an ear snapping mechanism. In the mechanical picking of corn, harvesters have come into wide use. These harvesters are of the inclined snapping roll type in which the ears of corn are removed from the standing stalks. One of the principal problems with harvesters of this type is the loss of shelled grain, as no saving means can be placed under the rolls due to the necessity for passing the stalks therethrough. There is also loss of whole ears due to the violent treatment of the stalk in snapping the ear. It has been proposed that stalks be severed and that the ears be subsequently removed. This has been accomplished both by traveling machines and by husking devices to which the stalks are fed after being cut and removed from the field.

The principal object of the present invention is to provide an improved machine of the stalk cutter type.

Another principal object is the provision of a tractor-mounted corn harvester of the cutter type so constructed that it may be easily mounted on and removed from a conventional farm tractor.

Another object is to provide a tractor-mounted cutter type corn harvester in which the stalks are delivered upwardly and rearwardly over the rear axle of the tractor, the ears being snapped therefrom and delivered forwardly of the rear axle to a husking device extending under the rear axle.

The above objects and others which will be apparent from the detailed description to follow are accomplished by a construction as shown in the drawings, in which:

Figure 1 is a side elevation with portions broken away in section approximately on the line 1—1 of Figure 2 showing a preferred embodiment of the invention mounted on a farm tractor; and Figure 2 is a plan view of the structure shown in Figure 1.

A corn harvester of the type disclosed in the drawings is a relatively complicated machine involving a great number of driving chains, gears, sprockets, and associated parts which extend in all three dimensions. This drive mechanism is conventional and follows standard engineering practice. In the interest, therefore, of making a clear showing of applicant's invention, only such driving mechanism has been shown as is necessary to illustrate generally the source of the power for the different drives and the elements which the drives operate. For the same reason a diagrammatic showing has been made of the frame structure and housing portions of the harvesting machine as these structures are usually fabricated from sheet metal, strap iron, angle bars, and castings, the showing of one of which would unnecessarily complicate the drawings without adding to the disclosure of applicants' invention which resides in the relative location of said functional elements and their relative location on a tractor. The drawings show a conventional farm tractor having a relatively narrow body portion 10, an extended rear axle structure 11, and a front steering bolster 12. Drive axles 13 extending from the housings 11 carry traction wheels 14 at the rear of the tractor. A pair of steerable wheels 15 are carried by the bolster 12 and a steering mechanism 16 is provided. A fuel tank 17 and a radiator and hood structure 18 are also indicated in the drawings. An operator's seat 19 is provided at the rear of the tractor in the usual location.

The harvesting device of the present invention consists generally of four units: a stalk divider A secured to the front of the tractor and extending around the steerable wheels 15; two harvester units B located at the sides of the tractor body and extending rearwardly over the rear axle structure between the operator's station and the traction wheels; husking units C extending under the rear axle structure of the tractor; and an elevator D extending upwardly and rearwardly from the central portion between the husking unit.

The divider unit A consists of a shield 20 extending around the front of the tractor and a divider point 21 extending forwardly from the shield. Said unit directs the fallen and leaning stalks from the rows being traversed into the throats of the harvesting units B.

Each of the harvesting units B consists of a built up housing and frame structure 80 indicated diagrammatically as a unitary structure pivoted by a bracket 22 on a member 23 of an attaching structure which is secured to the rear axle of the tractor as shown in Figure 1. Each unit B includes a forwardly extending housing and gathering structure 24, on which a gathering shoe 25 is mounted, and a second forwardly extending gathering structure 26 laterally spaced from the structure 24 to form a throat 27. A gathering chain 28 is indicated which feeds the stalks into the throat 27. Spaced directing members 29 on the gathering structures direct the stalks to a sickle-type cutter 30 which may be driven by a conventional pitman mechanism. The severed stalks are then carried upwardly by spaced conveyor chains 31 and 32. A conveyor belt 33 carried on sprockets 34 and 35 is spaced directly above the bottom 36 of the harvester unit, being inclined upwardly and extending rearwardly to carry the stalks, butt first, toward the rear of the tractor. A forwarding chain 37 mounted on sprockets 38 and 39 also engages the stalks forcing them into a horizontal position and feeding them rearwardly.

Each harvesting unit B is symmetric with the centerline of a tractor except for certain of the driving mechanisms. Only one unit will be described. The rear portion of the harvesting unit B is narrowed down to provide a housing 40 which extends over the rear axle of the tractor and is provided with a downwardly extending open end delivery chute 41 immediately forward of the rear axle structure and rearwardly of the sprockets 35. As the stalks move rearwardly and upwardly from the conveyor 33, they are fed between a pair of horizontal snapping rolls 42 which are journaled in the sides 43 of the housing 40. The rear portion of said housing beyond the rolls 42 is open to provide for rearward discharge of the stalks passing between the rolls 42. The snapped ears drop downwardly from said rolls forwardly of the rear axle structure through the chute 41. A grid 44 extends from beneath the lower one of the snapping rolls 42 upwardly to the termination of the housing 40. Said grid provides means for allowing the shelled grain passing through the snapping rolls to be recovered. After passing through the grid 44, the shelled grain drops onto a downwardly inclined bottom wall 45 on the housing 40 and passes through an opening 46 in the rear vertical wall of the housing 40 into said chute 41 where it is delivered to the husking means with the snapped ears.

To indicate one means by which the snapping rolls may be driven, a chain 47 is illustrated joining a sprocket on a shaft extension 48 from one of the snapping rolls 42 with a sprocket on a power driven shaft 49 extending from the body of the tractor. Any conventional means may be utilized for causing this drive mechanism and operating the snapping rolls 42 in the conventional manner with the adjacent portions rotating in the same direction and rearwardly as indicated by the arrows in Figure 1.

The pivotal connection of the husking unit B with the tractor at the rear of the tractor was referred to previously. Neither connection is illustrated to floatingly connect the forward portion of the harvesting unit with the tractor. A bracket 50 rigidly secured to the body of the tractor provides means for pivotally connecting a bell-crank 51. A link 52 is illustrated for connecting a rearwardly extending arm on the bell crank 51 to a bracket 53 on the housing structure of the harvesting unit. A tension spring 54 connected to an upwardly extending arm on the bell-crank 51 is shown as connected to a second bracket 55 on the tractor body, whereby the forward portion of the harvesting unit A is floatingly resiliently mounted.

The husking unit C consists of a structure which includes a housing 56 at each side of the tractor positioned beneath the chute 41 at its side to receive the snapped ears and shelled grain therefrom. Each of the housings 56 includes a substantially horizontal bottom 57, transversely spaced side walls 58, and a forwardly inclined front wall 59. The front wall 59 terminates above the bottom wall 57 to form an opening 60 through which husks are discharged by a conveyor belt 61. The conveyor belt 61 extends around suitable rotating supports including a forwardly located roller 62 and a rearwardly located roller 63. The upper run of the conveyor 61 slides over a guide plate 64 spaced from the bottom 57. Said guide plate is suitably supported on the side walls 58 of the housing 56, for example, by lugs 64'. The husks are delivered rearwardly through the opening 60, and any shelled grain which falls through the conveyor due to its slat-type of construction is dragged rearwardly over the bottom 57 and carried upwardly along a curved wall 65 through the open rear end of the housing 57. A receiving member in the form of a trough 66 extends rearwardly across the housing 56 secured thereto. Said trough forms a receptacle for an auger 67 which has oppositely directed spirals 68 at each end and is rotated in a direction to deliver both ears and shelled grain to the center thereof. The elevator D includes a housing 69 secured to the trough 66 and a conveyor 70 extending around and driven from the central portion of the auger 67. An upwardly extending sheet 71 is secured to the trough 66 providing compartments of substantial capacity for receiving material from the husking beds.

The husking beds each include a pair of conventional husking rolls 72 and an ear-forwarding conveyor chain 73 carried by longitudinally spaced sprockets 74 rotatable on vertical axes. This chain may be driven by any conventional gear and likewise the rolls 72 may be driven by conventional mechanism such as, for example, by the bevel gears 75. Said bevel gears may in turn be driven by a transverse shaft 76 which is driven by bevel gears 77, one of which is mounted on a power take-off shaft 78 extending rearwardly from the tractor. The chains 73 are operated in a direction such that the portion over the husking rolls moves rearwardly, whereby the ears which are delivered through the chute 41 are carried rearwardly during the husking operation and are delivered into the trough 66 where they are engaged by the auger 67.

The husking unit 66 is adapted to be carried rigidly on the rear axle structure of the tractor. As one means of illustrating how one unit may be mounted in position supporting members 79 extending under the bottom of the housings 56 are illustrated as being connected to an attaching frame structure secured to the rear axle housings. The only essential feature of attaching features is that the husking unit be carried rigidly on the rear axle structure of the tractor. The arrangement of the chute 41 with respect to the side walls 58 of the housings 56 provides the necessary relative movement between the harvesting units B and the housings of the husking structure C.

The operation of applicants' improved tractor-mounted corn harvester has been described along with the description of the elements thereof. It will be understood that all the units may be readily removed from the tractor. The husking unit C together with the elevator D may be merely removed by disconnecting the attaching structure on the rear axle housing and dropping the units to the ground or on supporting jacks, it only being necessary to drop the structures sufficiently so that the tractor may be driven forwardly. The harvesting units B may then be removed by disconnecting the attaching links 52 and the brackets 22 from the tractor associated parts with the units being supported in position by jacks or other means. The tractor may be backed away from said units, it being understood that either the units B or C may be first removed.

Applicant has shown and described only a preferred embodiment of his tractor-mounted corn harvester of the stalk cutter type. It is to be understood, however, that all modifications falling within the claims are contemplated as a part of the invention.

What is claimed is:

1. A tractor-mounted corn picker for a tractor having an extended rear axle comprising, a frame structure mounted alongside the tractor forwardly of the rear axle, gathering means carried by said frame structure, a cutter mechanism on said structure for severing standing stalks, means for conveying the severed stalks upwardly, butt first, toward the rear axle of the tractor, a pair of snapping rolls mounted forwardly of and above the rear axle, means providing for the delivery of snapped ears downwardly forwardly of the axle and of stalks rearwardly over the axle, a pair of longitudinally disposed husking rolls extending from a location under said delivery means rearwardly beneath the rear axle of the tractor, means for conveying the snapped ears rearwardly over said husking rolls, and an elevator mounted at the rear of the husking rolls to receive the husked ears.

2. A tractor-mounted corn picker for a tractor having an extended rear axle comprising, a frame structure mounted alongside the tractor forwardly of the rear axle, gathering means carried by said frame structure, a cutter mechanism on said structure for severing standing stalks, means for conveying the severed stalks upwardly, butt first, toward the rear axle of the tractor, transversely disposed snapping rolls mounted adjacent the rear axle, means providing for the delivery of snapped ears downwardly forwardly of the axle and of stalks rearwardly over the axle, longitudinally disposed husking rolls extending from a location under said delivery means rearwardly beneath the rear axle of the tractor, means for conveying the snapped ears rearwardly over said husking rolls, husk conveying means under said rolls, and shelled grain saving means under said husk conveying means.

3. A tractor-mounted corn picker for a tractor having a narrow body, an extended rear axle and a narrow front rolling support comprising, a frame structure mounted adjacent each side of the body forwardly of the rear axle, gathering means carried by said frame structures, cutter mechanism on said structures for severing standing stalks, means for conveying the stalks upwardly, butt first, toward the rear axle of the tractor, horizontally and transversely disposed snapping rolls mounted above the rear axle adjacent the tractor axle at the rear of each frame structure, means providing for the delivery of snapped ears downwardly forwardly of the axle and of stalks rearwardly over the axle, horizontally and longitudinally disposed husking rolls extending from a location under said delivery means rearwardly beneath the rear axle of the tractor, means for conveying the snapped ears rearwardly over said husking rolls, a husk conveyer means beneath said rolls, and shelled grain saving means beneath said husk conveyor.

LEE P. MILLARD.
MELVILLE J. MITCHELL.

REFERENCES CITED

The following references are of record in the file of this patent:

UNITED STATES PATENTS

| Number | Name | Date |
| --- | --- | --- |
| 800,094 | Fleming | Sept. 19, 1905 |
| 850,390 | McClure et al. | Apr. 16, 1907 |
| 1,616,283 | Shirey | Feb. 1, 1927 |
| 1,722,717 | Trottman | July 30, 1929 |
| 2,293,757 | Jochumsen | Aug. 25, 1942 |
| 2,340,084 | Scranton | Jan. 25, 1944 |
| 2,385,193 | Durgin | Sept. 18, 1945 |
| 2,427,861 | Johnson | Sept. 23, 1947 |
| 2,444,561 | Fergason | July 6, 1948 |